United States Patent [19]

Ady

[11] Patent Number: 4,850,925
[45] Date of Patent: Jul. 25, 1989

[54] DEER CALL

[75] Inventor: Daniel D. Ady, Caldwell, Id.

[73] Assignee: Lohman Manufacturing Co., Inc., Kans.

[21] Appl. No.: 286,459

[22] Filed: Dec. 16, 1988

[51] Int. Cl.$^4$ .............................................. A63H 5/00
[52] U.S. Cl. ...................................... 446/207; 84/330
[58] Field of Search ................................ 446/207–209, 446/204–206, 202, 216, 203, 213, 193; 43/1; 84/330

[56] References Cited

U.S. PATENT DOCUMENTS

| | | | |
|---|---|---|---|
| 350,521 | 10/1886 | Baldwin | 446/208 |
| 691,131 | 1/1902 | Gay | 446/202 |
| 1,646,530 | 10/1927 | Ferretti | 446/202 |
| 3,583,094 | 6/1971 | Tribell | 446/202 |
| 3,744,365 | 7/1973 | Kordula | 84/330 |

FOREIGN PATENT DOCUMENTS 434071  9/1926  Fed. Rep. of Germany ...... 446/207

*Primary Examiner*—Mickey Yu
*Attorney, Agent, or Firm*—Frank J. Dykas; Craig M. Korfanta

[57] ABSTRACT

A deer call 10 having a pair of opposing convex half shells 11 and 12 attached one to the other and having a concave inner surface, together form a longitudinal air passage. A pair of venturi bars 16, one each transversely disposed on each half shell 11 and 12 form a venturi within the air passage. A doubled band reed 15 is disposed within the venturi, essentially parallel to both venturi bars 16. The doubled band reed 15 is constructed from a polyethylene plastic sheet being folded in half and heat sealed along the folded edge 18. The heat sealed edge 18 is located within the venturi on the upstream end, while the pair of unconnected edges 19 are located on the downstream end.

5 Claims, 3 Drawing Sheets

DEER CALL

BACKGROUND OF THE INVENTION

1. Technical Field

This invention generally relates to game cals and in particular to a simply operated reed type deer call.

2. Background Art

Throughout the ages, hunters have strived to gain any possible advantage over their prey. Various game calls have been devised to lure animals into close proximity, much to the hunter's advantage. A particularly useful group of calls are reed type calls, wherein the hunter exhausts his pulmonary air through a longitudinal passage or cavity containing a reed. By varying the dimensions of the cavity and the air velocity, a skilled caller is able to closely duplicate the sounds of his prey.

Typical of these calls are devices disclosed in PIPER, U.S. Pat. No. 4,483,097, LAUBACH, U.S. Pat. No. 4,637,154, GALLAGHER, U.S. Pat. No. 4,030,241, GALLAGHER, U.S. Pat. No. 4,221,075, CARHART, U.S. Pat. No. 2,584,549 and LUCH, U.S. Pat. No. 2,470,823.

Piper teaches a game caller of wafer like shape for support against the roof of a user's mouth and including two diaphragms supported in spaced relation, apart from one another, for independent vibration. This particular call is well suited for calling turkeys.

Lauback teaches a bull elk call which has a pair of rectangular substantially coextensive planar members hinged together. An endless elastic band is positioned between the two planar members in a cavity defined by the planar members. The pitch of the Laubach device is altered by varying the cavity size by applying pressure to the two planar members.

Luch teaches a deer call having an elastic reed, such as a rubber band, positioned in a slot formed by two flat surfaces held in spaced relation to one another. Air is passed through the slot, past the elastic reed, to produce a pitch similar to the call of a deer.

Gallagher, U.S. Pat. No. 4,221,075, teaches a multiple pitch game call using the same principle as that of Luch using three differently sized cavities for producing three separate pitches. Gallagher, U.S. Pat. No. 4,030,241, teaches a combination deer and predator call, using a pair of rubber band type reeds having means for adjusting the tension and length of the reeds.

Carhart teaches a pair of half shells having a concave inner surface defining an air passage and an elastic band reed disposed therebetween.

In a related art field, several devices have been patented which have similar resonant cavities and elastic reeds disposed therein. FAWKERS, U.S. Pat. No. 918,835, GAY, U.S. Pat. No. 550,500, KIMPLE, U.S. Pat. No. 2,570,816, HORNE, U.S. Pat. No. 2,525,134 and BRAIN, British Patent No. 615,809, all teach like toys using a reed disposed in an air passage for producing similar sounds.

It can be readily inferred from the crowded art fields that there is much interest in providing a reed device which produces the optimum sound. Obviously, the goal is to provide a game call which produces the optimum sound and requires a minimum of skill. All of the above discussed devices require a great deal of skill in regulating the proper air flow and cavity size for their optimum output.

What is needed is a deer call which is capable of producing an accurate imitation with a minimum of skill on the caller's part.

DISCLOSURE OF INVENTION

This object is accomplished by a game call having a pair of opposing convex half sheels attached one to the other. The opposing convex half sheels have a concave inner surface and together form a longitudinal air passage. A pair of venturi bars, one each transversely disposed on each half shell, form a venturi within the air passage. A doubled band reed is disposed within the venturi, essentially parallel to both venturi bars. The doubled band reed is constructed from a polyethylene plastic sheet being folded in half and heat sealed along the folded edge. The heat sealed edge is located within the venturi on the upstream end, while the pair of unconnected edges are located on the downstream end.

It has been found that when air is passed through the venturi, the sound produced has an extreme likeness to that of a deer. Very little skill is required to accurately reproduce the call of a deer.

The principle of operation is thought to be centered around the pressure differential created around the doubled reed. While air is being passed through the venturi, low pressure areas are created on both sides of the doubled reed. Between the two folded sides however, there is a high pressure area which causes the sides to separate at their downstream edges. Consequently, the two folded sides are allowed to vibrate independently. This independent vibration is thought to produce the unique deer like sound, attributable to the present invention.

BEST MODE FOR CARRYING OUT INVENTION

Figure 1:
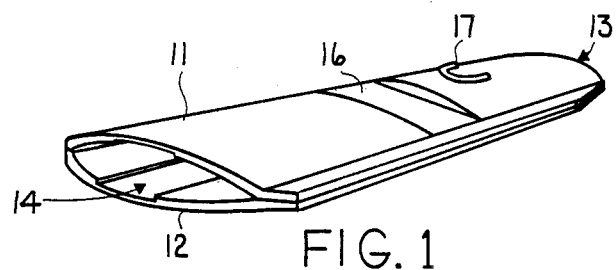
FIG. 1 is a perspective representational view of a deer call.

FIG. 1 shows deer call 10 having first convex half shell 11 attached juxtaposition second convex half shell 12. In this preferred embodiment, first convex half shell 11 and second convex half shell 12 are identical in size and structure.

Figure 2:
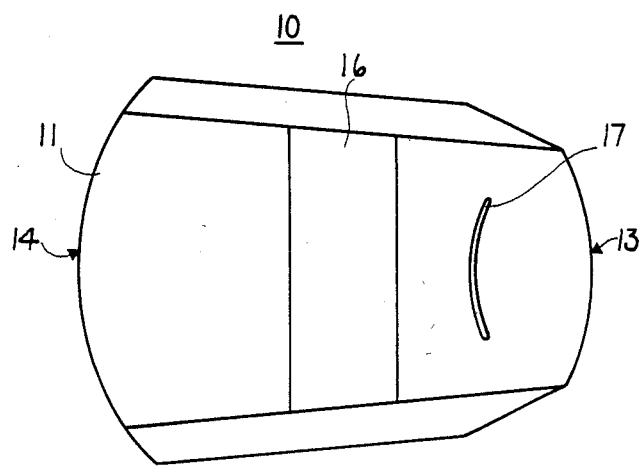
FIG. 2 is a top plan view of a deer call.

Referring also to FIG. 2, convex half shells 11 and 12, having inner concaved surfaces, are shown having formed therewith generally elongated and opposing venturi bars 16 and teeth ridges 17. Upstream end 13 is generally sized to facilitate positioning of this end portion of deer call 10 between the teeth of the caller. Teeth ridges 17 are provided to facilitate hand free holding of the deer call between the upper and lower teeth of the caller. Downstream end 14 is generally an enlarged end to enhance the resonance of the cavity and dynamics of the call.

Figure 3:
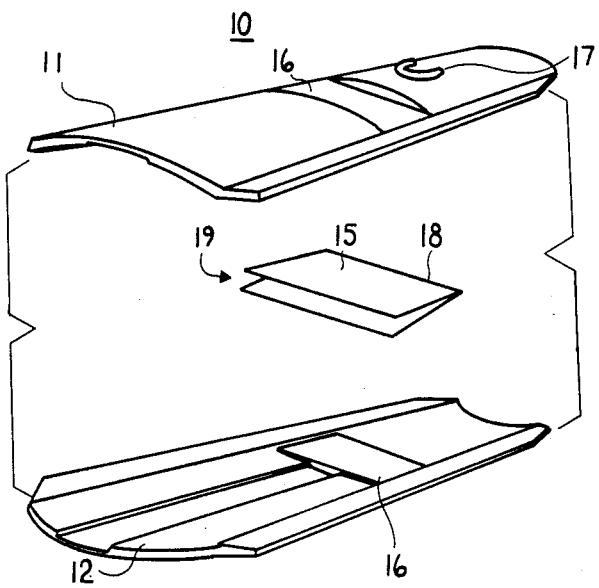
FIG. 3 is an exploded perspective representational view of a deer call showing the doubled reed to advantage.

Referring also now to FIG. 3, the construction of deer call 10 is graphically depicted. As can be seen on second convex half shell 12, second venturi bar 16 is transversely disposed with respect to the air flow. A doubled reed 15, which in this preferred embodiment is constructed of polyethylene plastic, is configured to have a heat sealed upstream edge 18 and two downstream edges 19. Doubled reed 15 is sized and shaped to lie generally coincident on venturi bars 16.

Figure 4:
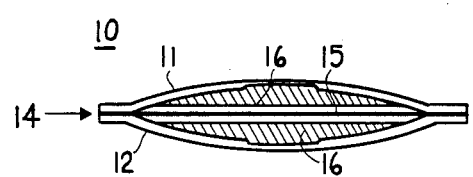
FIG. 4 is a downstream end view.
Figure 5:
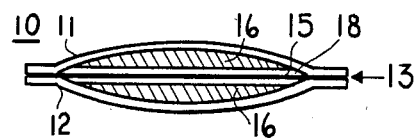
FIG. 5 is an upstream end view

FIGS. 4 and 5 show downstream end 14 and upstream ends 13 respectively. The positioning of reed 15 between opposing venturi bars 16 can be seen in both figures.

Figure 6:
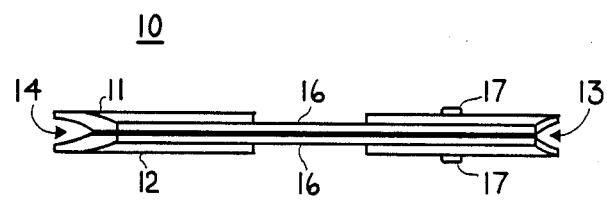
FIG. 6 is a side view.
Figure 7:
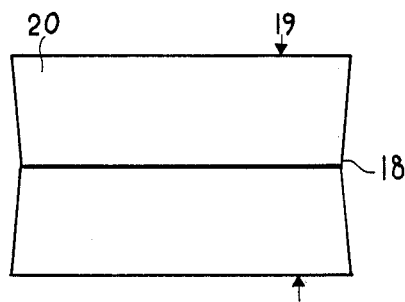
FIG. 7 is a top plan view of a doubled band reed before folding.

FIG. 6 shows deer call 10 in a side view, further illustrating the configuration of convex half shells 11 and 12. Referring now to FIG. 7, doubled reed 15 is shown in an unfolded state. During manufacture, a sheet of material 20, such as polyethylene plastic, is folded and heat sealed along a center line which defines a semi-rigid upstream edge 18. The two unconnected edges form double downstream edges 19. In practice, it has been found that the most effective reed is produced from a 4 to 5 mil sheet of polyethylene plastic and configured to have a folded width of ¾ of an inch.

In use, the caller simply places upstream end 13 in his or her mouth with teeth ridges 17 positioned behind his or her upper and lower teeth. The caller then simply exhales his or her pulmonary air and the call is initiated.

While there is shown and described the present preferred embodiment of the invention, it is to be distinctly understood that this invention is not limited thereto but may be variously embodied to practice within the scope of the following claims.

I claim:

1. A game call which comprises:
   a pair of opposing half shells each having a concave inner surface and being attached one to the other to define a longitudinal passage for passing air therethrough;
   a pair of opposing elongated venturi bars, each being formed integrally with one of the pair of opposing half sheels and further being transversely disposed on each half shell's concaved surface extending perpendicularly out therefrom and to juxtapose the opposing venturi bar; and
   a doubled band reed having an elongated shape essentially identical to that of said venturi bars, being disposed coincident said venturi bars and connected at its ends to both said half shells; and
   said doubled reed further having semi-rigid upstream edge and a pair of unconnected downstream edges.

2. The game call of claim 1 wherein said reed is constructed from a sheet of polyethylene plastic being folded and heat sealed along a centerline thereby forming said semi-rigid upstream edge.

3. The game call of claim 2 wherein said polyethylene plastic sheet is 4 to 5 mils thick.

4. The game call of claim 3 wherein said polyethylene sheet has a folded width of three-quarters of an inch.

5. The game call of claim 2 wherein said polyethylene sheet has a folded width of three-quarters of an inch.

* * * * *